United States Patent
Zhang et al.

(10) Patent No.: US 10,834,125 B2
(45) Date of Patent: Nov. 10, 2020

(54) METHOD FOR DEFENDING AGAINST ATTACK, DEFENSE DEVICE, AND COMPUTER READABLE STORAGE MEDIUM

(71) Applicant: TENCENT TECHNOLOGY (SHENZHEN) COMPANY LIMITED, Shenzhen (CN)

(72) Inventors: Haohao Zhang, Shenzhen (CN); Shuai Jin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/351,199

(22) Filed: Mar. 12, 2019

(65) Prior Publication Data
US 2019/0215336 A1    Jul. 11, 2019

Related U.S. Application Data (63) Continuation of application No. PCT/CN2017/096721, filed on Aug. 10, 2017.

(30) Foreign Application Priority Data

Dec. 9, 2016 (CN) .......................... 2016 1 1136442

(51) Int. Cl.
*H04L 9/00* (2006.01)
*H04L 29/06* (2006.01)

(52) U.S. Cl.
CPC ...... *H04L 63/1458* (2013.01); *H04L 63/0236* (2013.01); *H04L 63/1416* (2013.01);
(Continued)

(58) Field of Classification Search
USPC .......................................................... 726/23
See application file for complete search history.

(56) References Cited

U.S. PATENT DOCUMENTS

| | | | | |
|---|---|---|---|---|
| 7,054,930 B1 * | 5/2006 | Cheriton | ............ | H04L 63/0263 370/390 |
| 7,454,610 B2 * | 11/2008 | Buer | ..................... | H04L 63/045 713/153 |
| 2004/0054925 A1 * | 3/2004 | Etheridge | ........... | H04L 63/1425 726/22 |

FOREIGN PATENT DOCUMENTS

| | | |
|---|---|---|
| CN | 101123492 A | 2/2008 |
| CN | 101202742 A | 6/2008 |

(Continued)

OTHER PUBLICATIONS

The World Intellectual Property Organization (WIPO) International Search Report for PCT/CN2017/096721 dated Oct. 19, 2017 5 Pages (including translation).

*Primary Examiner* — Christopher J Brown
(74) *Attorney, Agent, or Firm* — Anova Law Group, PLLC (57) ABSTRACT

Embodiments of the present disclosure disclose a method for defending against a User Datagram Protocol (UDP) attack and a defense device. The method is implemented by a defense device, the defense device comprising a memory, a processor, and a bus system. The method comprising: detecting, by the defense device, whether a target host is attacked by a UDP attack from an attack device; obtaining, by the defense device, an Internet Control Message Protocol (ICMP) data packet sent back by the target host to the attack device, in response to the target host being attacked by the attack device; extracting, by the defense device, information about target ports in the ICMP data packet; and performing, by the defense device according to the information about the (Continued)

target ports, interception processing on UDP data packets sent by the attack device to the target ports.

8 Claims, 7 Drawing Sheets

(52) U.S. Cl.
CPC ............ *H04L 63/30* (2013.01); *H04L 69/164* (2013.01); *H04L 2463/141* (2013.01); *H04L 2463/142* (2013.01)

(56) References Cited

FOREIGN PATENT DOCUMENTS

| | | |
|---|---|---|
| CN | 103501302 A | 1/2014 |
| CN | 104486340 A | 4/2015 |

\* cited by examiner

METHOD FOR DEFENDING AGAINST ATTACK, DEFENSE DEVICE, AND COMPUTER READABLE STORAGE MEDIUM

RELATED APPLICATIONS

This application claims priority to Chinese Patent Application No. 201611136442.4, filed with the Chinese Patent Office on Dec. 9, 2016, and entitled "METHOD FOR DEFENDING AGAINST ATTACK AND DEFENSE DEVICE", and PCT Application No. PCT/CN2017/096,721, filed on Aug. 10, 2017, and entitled "METHOD FOR DEFENDING AGAINST ATTACK AND DEFENSE DEVICE", which are incorporated herein by reference in their entirety.

FIELD OF TECHNOLOGY

The present disclosure relates to the computer field, and in particular, to a method for defending against an attack, a defense device, and related computer readable storage medium.

BACKGROUND OF THE DISCLOSURE

With the rapid development of Internet, the security of a network is increasingly valued by users. The network itself has security defects, and a denial of service (DoS) attack becomes one of common network attack technologies and greatly affects effective services of the network and a service hosting system. Especially, for distributed denial of service (DDoS) attacks, due to concealment and distribution of the DDoS attacks, it is difficult to detect the DDoS attacks and defending against the DDoS attacks. As a result, the security of Internet is severely threatened. A User Datagram Protocol (UDP) attack is a relatively representative type in the DDoS attack, the UDP is a simple transport layer protocol for data packets, and a difference between the UDP and the Transmission Control Protocol (TCP) is that the UDP does not provide reliability of transmission. An objective of the UDP attack is to occupy a network bandwidth by sending a large number of UDP data packets to block the network.

Usually, to defend against an attack, UDP defense is implemented through rate limiting defense. In the rate limiting defense, a threshold is often set based on empirical values, traffic of packets is analyzed, and rates of the packets are limited in aspects such as a source port and a destination port.

However, a rate limiting defense method cannot cope with accidental and abnormal use scenarios, and normal packets are easily and mistakenly discarded, causing transmission failures of normal packets.

SUMMARY

Embodiments of the present disclosure provide a method for defending against an attack, a defense device and a computer readable storage medium, to reduce a probability that a normal UDP data packet is mistakenly discarded, thereby ensuring successful transmission of normal packets.

According to a first aspect of the present disclosure, an embodiment of the present disclosure provides a method for defending against a UPD attack. The method is implemented by a defense device, the defense device comprising a memory, a processor, and a bus system. The memory is configured to store a computer program. The processor is configured to execute the computer program. The bus system is configured to connect the memory and the processor, to cause the memory to communicate with the processor. The method comprising: detecting, by the defense device, whether a target host is attacked by a UDP attack from an attack device; obtaining, by the defense device, an Internet Control Message Protocol (ICMP) data packet sent back by the target host to the attack device, in response to the target host being attacked by the attack device; extracting, by the defense device, information about target ports in the ICMP data packet; and performing, by the defense device according to the information about the target ports, interception processing on UDP data packets sent by the attack device to the target ports.

According to a second aspect of the present disclosure, an embodiment of the present disclosure provides a defense device. The device includes a detection module, configured to detect whether a target host is attacked by a User Datagram Protocol (UDP) attack from an attack device; an obtaining module, configured to obtain an Internet Control Message Protocol (ICMP) data packet sent back by the target host to the attack device, in response to the detection module detecting that the target host is attacked by the attack device; an information extraction module, configured to extract information about target ports in the ICMP data packet; and an interception processing module, configured to perform, according to the information about the target ports extracted by the information extraction module, interception processing on UDP data packets sent by the attack device to the target ports determined by the information extraction module.

According to a third aspect of the present disclosure, an embodiment of the present disclosure provides a defense device. The defense device includes a memory, a processor and a bus system. The memory is configured to store a computer program. The bus system is configured to connect the memory and the processor, to cause the memory to communicate with the processor. The processor is configured to execute the computer program in the memory, to specifically implement a method. The implemented method includes the steps of detecting whether a target host is attacked by a User Datagram Protocol (UDP) attack from an attack device; obtaining an Internet Control Message Protocol (ICMP) data packet sent back by the target host to the attack device, when the target host is attacked by the UDP attack from the attack device; extracting information about target ports in the ICMP data packet; and performing, according to the information about the target ports, interception processing on UDP data packets sent by the attack device to the target ports.

According to a fourth aspect of the present disclosure, an embodiment of the present disclosure further provides a non-transitory computer readable storage medium storing a program instruction, and when executing the stored program instruction, a processor performs any one of the foregoing methods.

In embodiments of the present disclosure, the ICMP is used for diagnosis of logical errors. When the attack device sends UDP data packets to a port disabled by the target host, the target host sends back the ICMP data packet to the attack device. The ICMP information includes information about an unreachable target port. In embodiments of the present disclosure, if the defense device detects that the target host is attacked, the defense device obtains the ICMP data packet sent back by the target host to the attack device and extracts the port information in the ICMP data packet, so that the defense device may learn which ports are attacked, and perform interception processing on the UDP data packets sent by the attack device to the target ports. In embodiments of the present disclosure, problems related to a normal UDP data packet being filtered out due to blind rate limiting performed in a conventional manner is avoided, thereby reducing a mistaken discarding rate of normal data packets, and ensuring transmission of normal data.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings.

DESCRIPTION OF EMBODIMENTS

Embodiments of the present disclosure provide a method for defending against an attack, and a defense device, to reduce a probability that a normal UDP data packet is mistakenly discarded, thereby ensuring successful transmission of a normal packet.

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

In the specification, claims, and the accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

It should be understood that the defense device provided in the present disclosure includes: a memory, a processor and a bus system. The memory is configured to store a program, the processor is configured to execute the program in the memory, and the bus system is configured to connect the memory and the processor, to cause the memory to communicate with the processor.

The processor is mainly configured to perform the following steps: first, detecting whether a target host is attacked by a UDP attack from an attack device; and when the target host is attacked by the UDP attack from the attack device, obtaining an ICMP data packet sent back by the target host to the attack device; then extracting information about target ports in the ICMP data packet; and finally, performing, according to the information about the target ports, interception processing on UDP data packets sent by the attack device to the target ports.

It should be understood that the memory in the defense device may include a read-only memory (ROM) and a random access memory (RAM), and provide an instruction and data for the processor. A part of the memory may further include a non-volatile random access memory (NVRAM). The memory stores the following elements, executable modules or data structures, or a subset thereof, or an extended set thereof: operation instructions: including various operation instructions, and used to perform various operations; and an operating system, including various system programs, and used to implement various basic services and process hardware-based services.

The processor controls operations of the defense device, and the processor may also be referred to as a central processing unit. The memory may include a ROM and a RAM, and provide instructions and data for the processor. A part of the memory may further include a NVRAM. In specific applications, components of the defense device are coupled together by using a bus system, where in addition to a data bus, the bus system may include a power bus, a control bus, a status signal bus, and the like.

The method disclosed in the foregoing embodiments of the present disclosure may be applied to the processor, or may be implemented by the processor. The processor may be an integrated circuit chip and has a signal processing capability. In an implementation process, steps of the foregoing method may be implemented by using a hardware integrated logic circuit in the processor or instructions in a form of software. The processor may be a general-purpose processor, a digital signal processor (DSP), an application-specific integrated circuit (ASIC), a field-programmable gate array (FPGA), or other programmable logic devices, discrete gate or transistor logic devices, and discrete hardware components, may implement or perform methods, steps, and logical block diagrams disclosed in the embodiments of the present disclosure. The general-purpose processor may be a micro-processor, or the processor may be any conventional processor, or the like. The steps in the methods disclosed in the embodiments of the present disclosure may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory, and the processor reads information in the memory and performs steps of the foregoing methods in combination with hardware of the processor.

For ease of understanding, terms used in describing the embodiments of the present disclosure are described below.

UDP Flood attack: UDP is a simple transport layer protocol for data packets and is a protocol having no connection. Different from the TCP protocol, the UDP does not provide reliability of transmission. An objective of the UDP flood attack is to occupy a network bandwidth by sending a large number of UDP data packets, to block the network. A feature of the UDP flood attack is that no request packet is sent, and an attack device directly sends a large number of UDP packets of false IPs or deformed UDP data packets to attack a target host. For example, when an attack network formed by a plurality of attack devices simultaneously send high-rate real-time video flows to a network, the network is blocked, and a server denies a service. The target host cannot perform normal services. Consequently, the UDP flood is caused.

ICMP: The ICMP is used to: diagnose logical errors, feedback error report information to a data packet sender, and return, to a device sending original data, an error packet that is sent along with the error report information. Because only the sending device is the logical receiver of the error packet, the sending device may determine a type of an error according to the ICMP packet.

For example, referring to Table 1 below, Table 1 below is a description of an example of error report information included in the ICMP data packet. The error report information of the ICMP data packet includes much content, and several types in Table 1 below are used as an example in this embodiment of the present disclosure and do not constitute a limitation on the description of the present disclosure. Referring to Table 1:

TABLE 1

| Type (type) | Code (code) | Content description |
|---|---|---|
| 3 | 0 | Network Unreachable-Network Unreachable |
| 3 | 1 | Host Unreachable-Host Unreachable |
| 3 | 2 | Protocol Unreachable-Protocol Unreachable |
| 3 | 3 | Port Unreachable-Port Unreachable |

Figure 1:
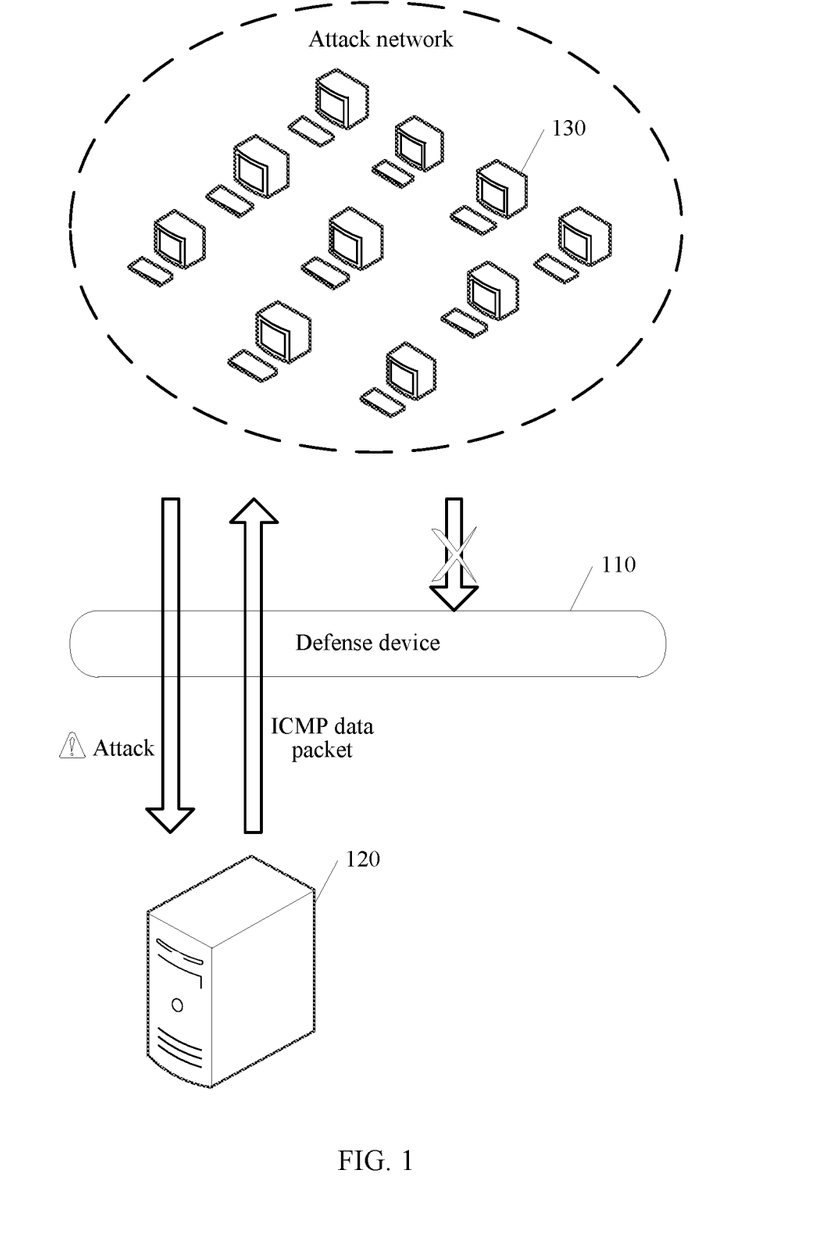
FIG. 1 is a schematic architectural diagram of an embodiment of network deployment of a defense device according to embodiments of the present disclosure.

An embodiment of the present disclosure provides a method for defending against an attack. The method for defending against an attack provides a method for defending against a UDP flood attack. The method for defending against an attack is applied to a defense device. For further explanation, refer to FIG. 1. FIG. 1 is a schematic architectural diagram of network deployment of the defense device. In the schematic architectural diagram shown in FIG. 1, a defense device 110, a target host 120 and an attack device 130 are included. The attack device 130 is a device attacking a target host, a plurality of attack devices 130 may form an attack network, the target host 120 is an attacked device, and the target host 120 may be a server, or may be another network device. For example, the target host may be a domain name system (DNS) server, a video streaming server or a Radius authentication server, or a cloud server or a data center server. The foregoing server is only an example of the target host and does not constitute a limitation on the description of on the present disclosure.

The defense device 110 is configured to detect whether a target host is attacked by a UDP attack from an attack device. When the defense device 110 determines that the target host 120 is attacked, the defense device 110 obtains an ICMP data packet sent back by the target host 120 to the attack device 130, and extracts information about target ports in the ICMP data packet. If the target ports are "unreachable" ports, the defense device 110 performs interception processing on UDP data packets sent by the attack device 120 to the target ports.

The defense device is configured to defend against an attack launched to a target host. Functions of the defense device may be integrated into the attacked target host, or the defense device may be an independent device. During actual application, implementations of specific deployment of the defense device are not limited in the present disclosure.

In this embodiment of the present disclosure, when the target host disables a UDP port, if a UDP attack is detected, with reference to an ICMP error reporting mechanism, the information about the target ports in an ICMP packet is obtained. The defense device determines that UDP data packets have attacked the target ports of the target host, and then interception processing is pertinently performed on the UDP data packets sent by the attack device to the target ports, thereby defending against a UDP attack. According to the method provided in this embodiment of the present disclosure, a case in which a normal UDP data packet is mistakenly discarded due to blind rate limiting in a conventional manner can be avoided, thereby reducing the mistaken discarding rate.

Figure 2:
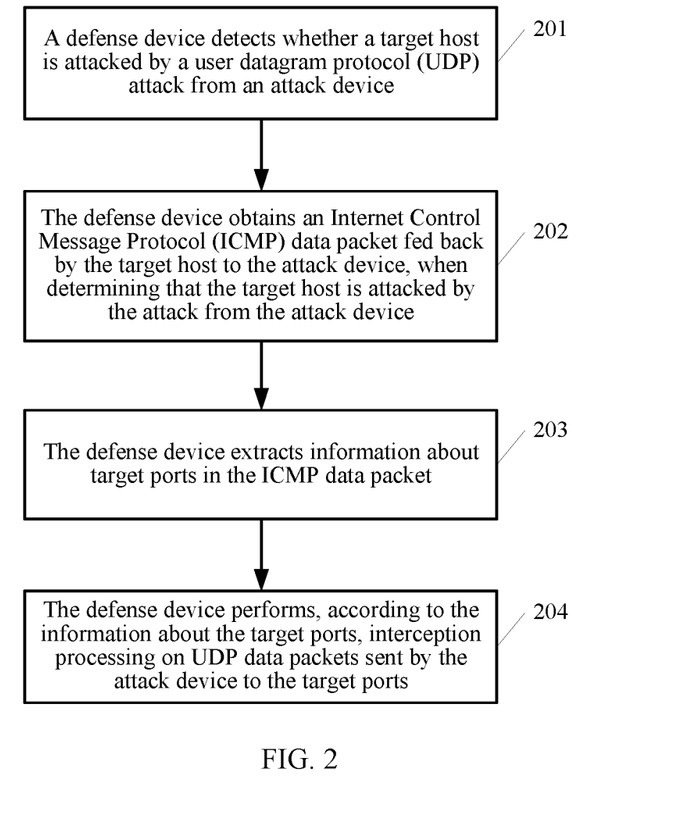
FIG. 2 is a schematic flowchart of an embodiment of a method for defending against an attack according to embodiments of the present disclosure.

The following describes in detail the method for defending against an attack provided in the embodiments of the present disclosure. Referring to FIG. 2, an embodiment of the method for defending against an attack according to the embodiments of the present disclosure includes the following steps.

Step 201: A defense device detects whether a target host is attacked by a UDP attack from an attack device.

The defense device is configured to detect whether the target host is attacked by a UDP flood from the attack device, and the detection method may be specifically as follows.

In a first possible implementation, the defense device monitors the number of UDP data packets received by the target host per unit time. If the number of UDP data packets is greater than a second threshold, the defense device determines that the target host is attacked by the UDP attack from the attack device. During actual application, the second threshold may be set according to an actual processing capability of the target host. For example, when the defense device monitors that the number of UDP data packets received by the target host in one second is greater than 1000, the defense device determines that the target host is already attacked by the UDP flood.

In a second possible implementation, detection may be performed according to a feature of the UDP data packets. A UDP attack data packet generated by a hacker program has a common feature, and the common feature may be detected on the following aspects.

A first aspect is a length of a data packet. For example, an attack packet has a determined length or a length within a length range. A second aspect is content in a data packet. For example, content of an attack packet may change regularly, or may not change, or there is a fingerprint in the attack packet. A third aspect is a feature needed by a program providing a service, for example, a source address of a data packet. The source address either is random, or sequentially increases. During actual application, the defense device may perform detection on at least one of the three aspects. For example, the length and data content of the UDP data packets may be used as a feature, to determine whether the target host is attacked by a UDP attack from the attack device. It should be noted that, during actual application, with the development of technologies, features of a UDP attack data packet generated by the hacker program may possibly change. The features on the three aspects of the attack data packet are only used as an example and do not constitute a limitation on description of the present disclosure.

In a third possible implementation, the number of UDP data packets and a usage ratio of a central processing unit processor (CPU) of the target host may be monitored, and if the number of UDP data packets is greater than a third threshold and the usage ratio of the CPU is greater than a fourth threshold, it is determined that the target host is attacked by a UDP attack.

Based on the first and the third possible implementations, for setting of a threshold of the UDP data packets, different thresholds may be set according to different time periods. This is because service content of the target host may have a peak service time period and a trough service time period according to different time periods. For example, if the target host is a streaming media video server, currently, young people are already used to a lifestyle at night, a daytime working time period is between 8 o'clock to 18 o'clock, and a leisure time period is between 20 o'clock to 23 o'clock. Therefore, for the streaming media video server, a first peak service time period may be between 20 o'clock to 23 o'clock, and a second peak service time period may be between 23 o'clock to 24 o'clock. Therefore, during actual application, a threshold can be set based on historical data of the streaming media video server. For example, if it is detected that UDP data received by the target host between 20 o'clock to 23 o'clock is greater than the first threshold, it is determined that the target host is attacked by a UDP attack. If it is detected that UDP data received by the target host between 23 o'clock to 24 o'clock is greater than a second threshold, it is determined that the target host is attacked by a UDP attack. The second threshold is less than the first threshold. It should be noted that during actual application, the foregoing division for a time period can be set according to different server types. This embodiment of the present disclosure only provides an example for one type of server. This does not constitute a limitation on the description of the present disclosure.

Step 202: The defense device obtains an ICMP data packet sent back by the target host to the attack device, when the target host is attacked by the UDP attack from the attack device.

The target host includes a plurality of UDP ports, and may include 65536 ports at most. When the target host disables a UDP port, if at least one port receives a UDP data packet sent by the attack device. For example, the port is a port 21 (which is mainly used for a file transmission protocol service), the target host feeds back, to the attack device, an ICMP data packet, which has a type "3", code "3", and the content "the port is unreachable", that is, the target host does not provide a UDP service of the port to the outside.

When the defense device determines that the target host is currently attacked by a UDP flood attack, the defense device obtains an ICMP data packet sent back by the target host to the attack device.

Step 203: The defense device extracts information about target ports in the ICMP data packet.

The ICMP load carries UDP packet information sent by the attack device, and the UDP packets include: (1) a source port (source port); (2) a destination port (destination port); (3) a length: a length of a UDP. The defense device extracts a destination port in the ICMP data packet, the destination port is an unreachable target port. For example, the target port is a port 21. It should be noted that, the target port is used as an example for description, and does not constitute a limitation on the description of the present disclosure.

Step 204: The defense device performs, according to the information about the target ports, interception processing on UDP data packets sent by the attack device to the target ports.

When receiving the UDP data packets sent by the attack device, the defense device obtains a destination port in the UDP data packets, and if the destination port is the same as the target port, the defense device performs interception processing on the UDP data.

In some embodiments, the interception processing may be specifically directly discarding the UDP data packets sent by the attack device. For example, when the defense device receives again a UDP data packet whose destination port is the port 21, it indicates that the UDP data packet is a UDP attack packet. Therefore, the defense device discards the UDP data packet, thereby defending against a UDP attack launched to the target host.

Figure 3:
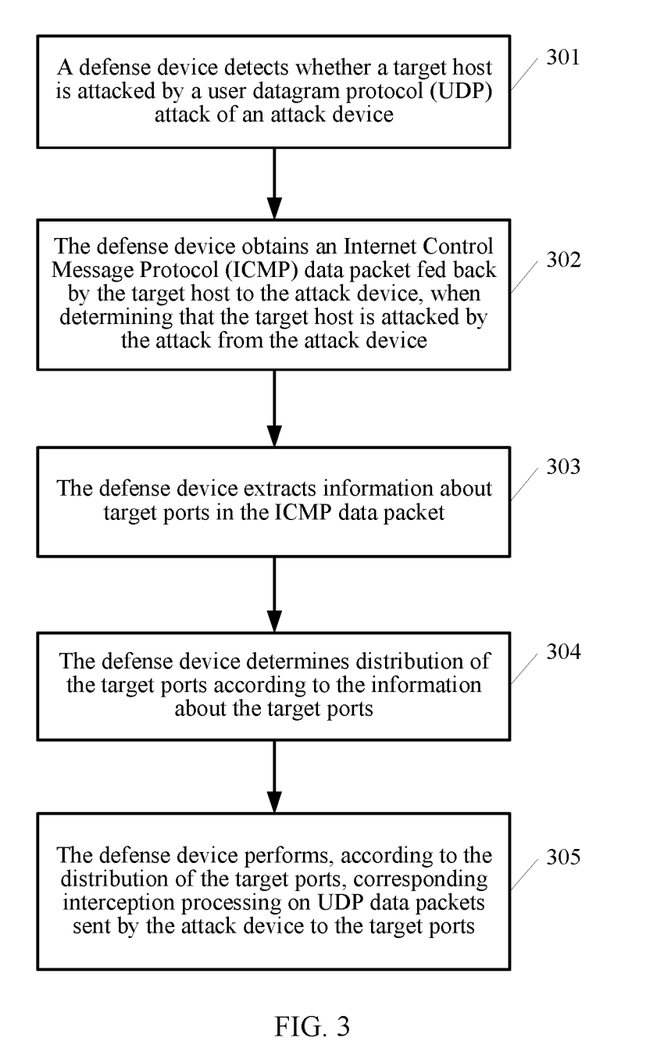
FIG. 3 is a schematic flowchart of another embodiment of a method for defending against an attack according to embodiments of the present disclosure.

Referring to FIG. 3, another embodiment of the method for defending against an attack provided in the embodiments of the present disclosure includes the following steps:

Step 301 to step 303 are familiar to step 201 to step 203 in the embodiment corresponding to FIG. 2, and are not described herein again.

Step 304: The defense device determines distribution of the target ports according to the information about the target ports.

The attack device attacks at least one port of a target host, and when more than two ports are attacked by the attack device, the defense device may determine the distribution of the target ports according to the information about the target ports. The distribution of the target ports includes centralized distribution and dispersed distribution.

The centralized distribution means that a small number of centralized ports are attacked by the attack device. The number of ports is greater than or equal to 1, and is less than a target threshold. For example, the target threshold is 10. Ports attacked by the attack device are centralized at a port 21 and a port 25 in distribution. The dispersed distribution means that ports attacked by the attack device are dispersed at a large number of ports, or ports attacked by the attack device are dispersed in one or more port ranges. For example, the attacked ports are ports 0-955, or ports 1024-1120. It should be noted that in this embodiment of the present disclosure, specific port numbers of centralized distributed ports and dispersed ports are used as an example, and do not constitute a limitation on the description of the present disclosure.

Step 305: Perform, by the defense device according to the distribution of the target ports, corresponding interception processing on UDP data packets sent by the attack device to the target ports.

In a possible implementation manner, when the distribution of the target ports is the centralized distribution, the defense device discards the UDP data packets sent to the target ports. For example, the target ports are the port 21 and the port 25, the defense device directly discards UDP data packets sent to the port 21 and the port 25. In some embodiments, because the attacked target ports are centrally distributed ports, and a relatively small number of ports are included in the target ports, the defense device may record a status of the target ports to form a target port list. The defense device may directly discard the UDP data packets sent to the ports recorded in the target port list.

When the distribution of the target ports is the dispersed distribution, the defense device limits traffic of the UDP data packets sent to the target ports within a first threshold. That is, the number of UDP data packets allowed to pass through the target ports per second is limited within a first threshold, and the first threshold may be set according to the number of UDP data packets normally processed by the target server. In this embodiment of the present disclosure, when the distribution of the target ports is the dispersed distribution, because the target ports indicate a range of attacked ports, or a large number of attacked ports are included in the target ports, there may be a relatively low probability that there is an enabled service port in the target ports. For example, the target ports are ports 0-55, where a port 22 is enabled, and if UDP data sent to the port 22 is discarded before, a normal UDP data packet sent to the port 22 may also be discarded. To resolve the problem, traffic of the UDP data packets sent by the attack device to the target ports may be limited within the first threshold, so that the normal UDP data packet may be sent to the target ports. Further, reference may further be made to features of a UDP attack packet. The UDP attack packet sent to the target ports may be directly discarded. In addition, the UDP attack packet sent to the target ports may be randomly discarded, or at least one UDP attack packet may be discarded.

Figure 4:
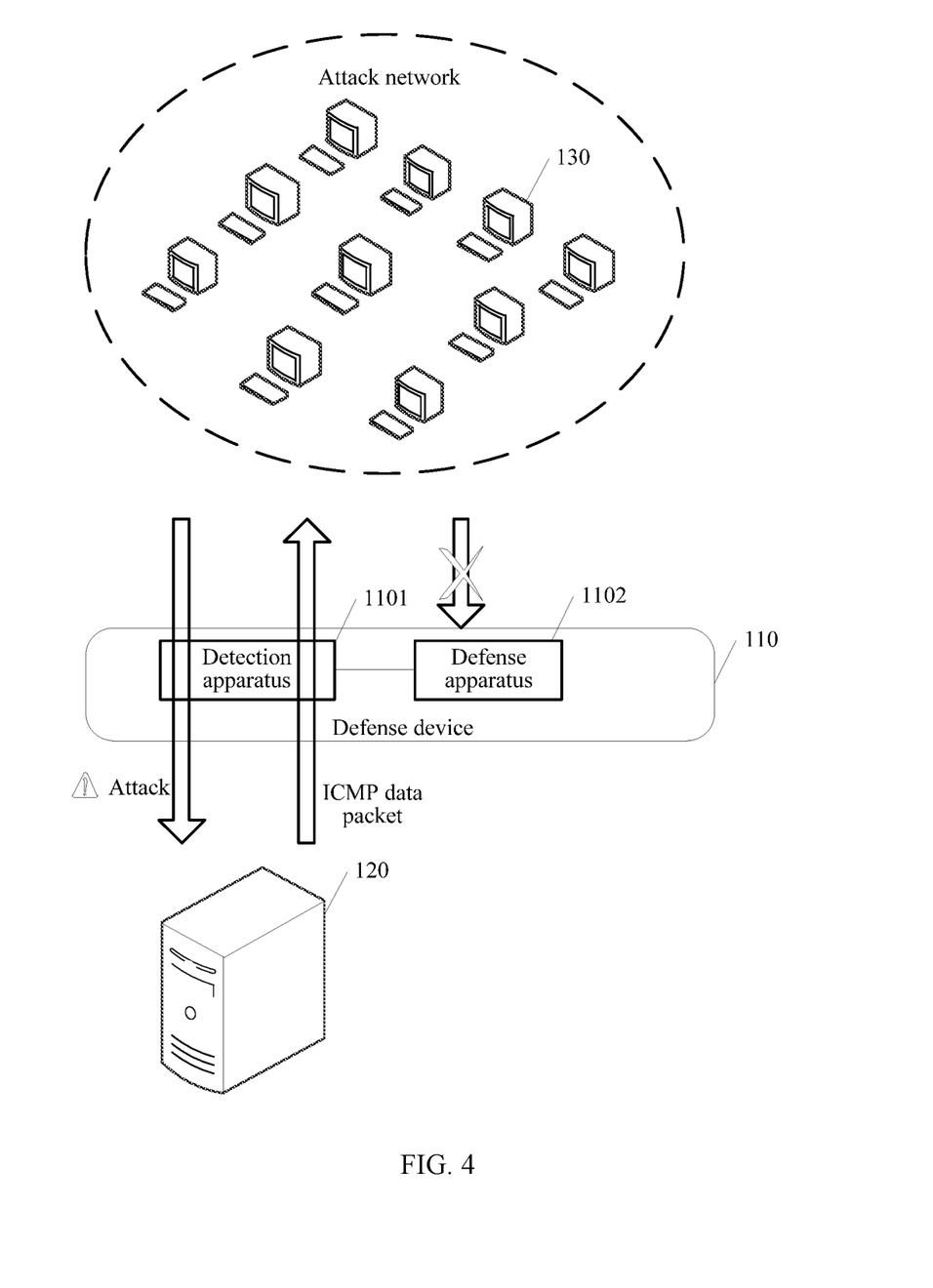
FIG. 4 is a schematic architectural diagram of another embodiment of network deployment of a defense device according to embodiments of the present disclosure.

The embodiments corresponding to FIG. 2 and FIG. 3 may be based on a schematic architectural diagram of network deployment of the defense device in FIG. 1. In another application scenario, the defense device may include a detection apparatus and a defense apparatus, and functions of the defense device may be performed by the detection apparatus and the defense apparatus. Referring to FIG. 4, FIG. 4 is a schematic architectural diagram of another embodiment of network deployment of the defense device. In the schematic architectural diagram shown in FIG. 4, a defense device 110, a target host 120 and an attack device 130 are included. The defense device 110 includes a detection apparatus 1101 and a defense apparatus 1102. The detection apparatus 1101 detects whether the target host 120 is attacked by a UDP attack from the attack device. When detecting that the target host 120 is attacked, the detection apparatus 1101 obtains an ICMP data packet sent back by the target host 120 to the attack device, the detection apparatus 1101 extracts information about target ports in the ICMP data packet, and transmits the information about the target ports to the defense apparatus 1102. The defense apparatus 1102 performs interception processing on UDP data packets sent by the attack device 130 to the target ports.

The detection apparatus 1101 may include a processor for executing one or more software or firmware programs and a memory, an integrated logical circuit, and/or another component that may provide the foregoing functions. The detection apparatus 1101 is integrated into the target host. Alternatively, the detection apparatus 1101 may be a hardware device independent of the target host.

For further explanation of functions of the detection apparatus, refer to the method performed by the defense device in step 201 to step 203 in the embodiment corresponding to FIG. 2, and the method performed by the defense device in step 301 to step 303 in the embodiment corresponding to FIG. 3. For further explanation of functions of the defense apparatus, refer to the method performed by the defense device in step 204 in the embodiment corresponding to FIG. 2, and the method performed by the defense device in step 304 to step 305 in the embodiment corresponding to FIG. 3. This is not described herein.

In this embodiment of the present disclosure, functions of the defense device are performed by the detection apparatus and the defense apparatus, and another deployment scenario of the defense device for defending against a UDP attack is provided. In this embodiment of the present disclosure, different deployment manners may be selected according to an actual application scenario. For example, during actual application, the detection apparatus may be a traffic detector, and the defense apparatus may be a firewall. That is, the functions of the defense device may be performed by the traffic detector and the firewall. Therefore, different application scenarios of the solutions of the present disclosure may be added, and adaptability of the present disclosure is enhanced.

Figure 5:
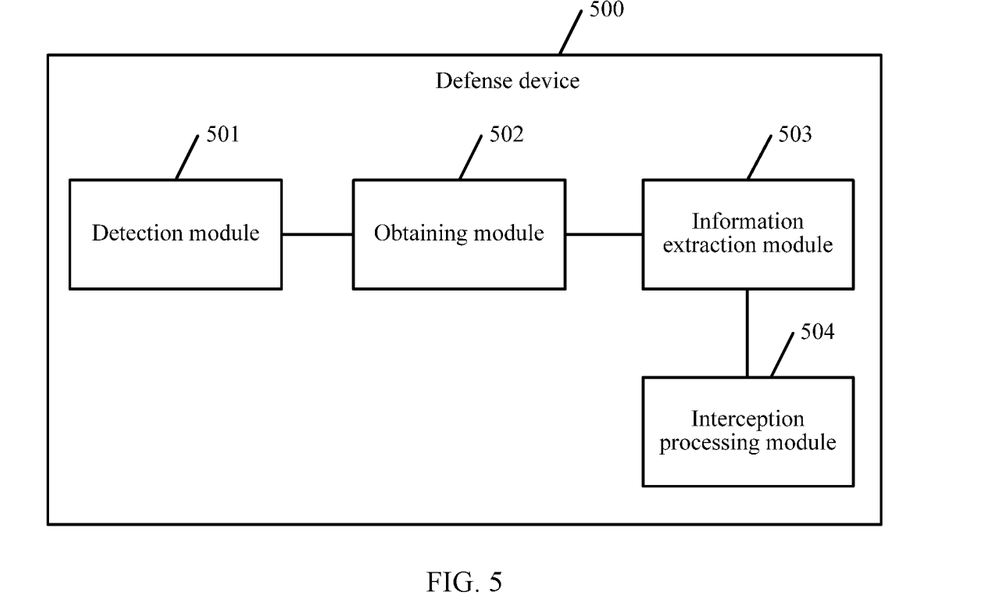
FIG. 5 is a schematic structural diagram of an embodiment of a defense device according to embodiments of the present disclosure.

Referring to FIG. 5, the embodiments of the present disclosure provide an embodiment of a defense device 500, including: a detection module 501, configured to detect whether a target host is attacked by a UDP attack of an attack device; an obtaining module 502, configured to obtain an ICMP data packet sent back by the target host to the attack device, when the detection module 501 detects that the target host is attacked by the UDP attack from the attack device; an information extraction module 503, configured to extract information about target ports in the ICMP data packet; and an interception processing module 504, configured to perform, according to the information about the target ports extracted by the information extraction module 503, interception processing on UDP data packets sent by the attack device to the target ports determined by the information extraction module 503.

In some embodiments, the interception processing module 504 is further configured to discard the UDP data packets sent by the attack device to the target ports.

Figure 6:
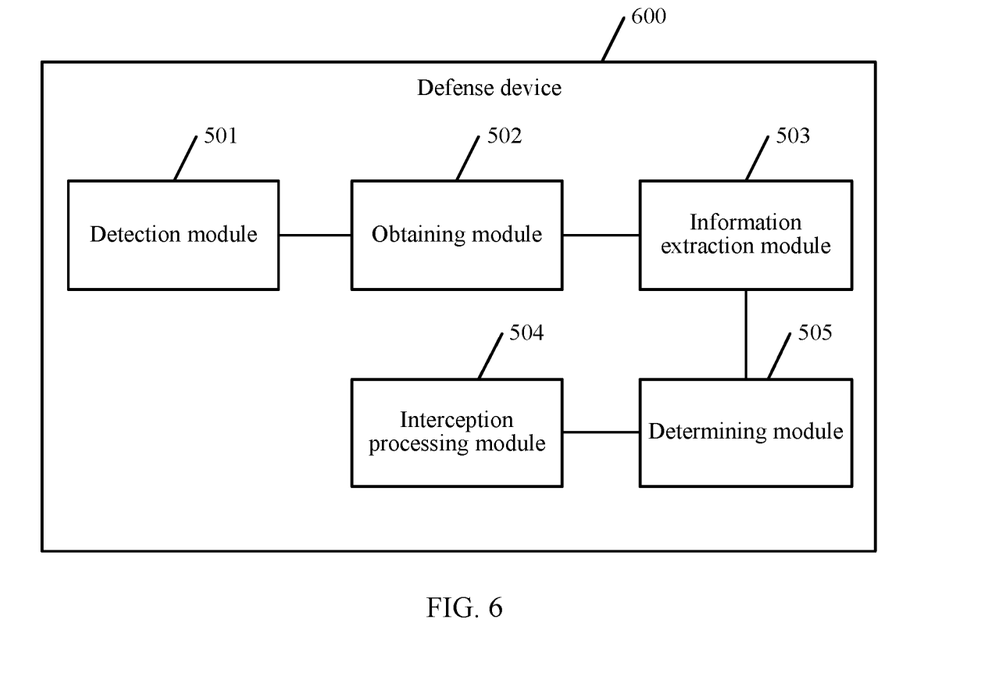
FIG. 6 is a schematic structural diagram of another embodiment of a defense device according to embodiments of the present disclosure.

Based on the embodiment corresponding to FIG. 5, and referring to FIG. 6, the embodiments of the present disclosure further provide another embodiment of a defense device 600, including:

The defense device further includes a determining module 505.

The determining module 505 is configured to determine distribution of the target ports according to the information about the target ports.

The interception processing module 504 is further configured to perform, according to the distribution of the target ports that is determined by the determining module 505, interception processing on the UDP data packets sent by the attack device to the target ports.

In some embodiments, the distribution of the target ports includes centralized distribution and dispersed distribution. The interception processing module is further configured to discard UDP data packets sent to the target ports, when the determining module 505 determines that the distribution of the target ports is the centralized distribution.

The interception processing module is further configured to: when the distribution of the target ports is the dispersed distribution, limit traffic of the UDP data packets sent to the target ports within a first threshold, or randomly discard, at least one UDP data packet sent to the target ports.

Figure 7:
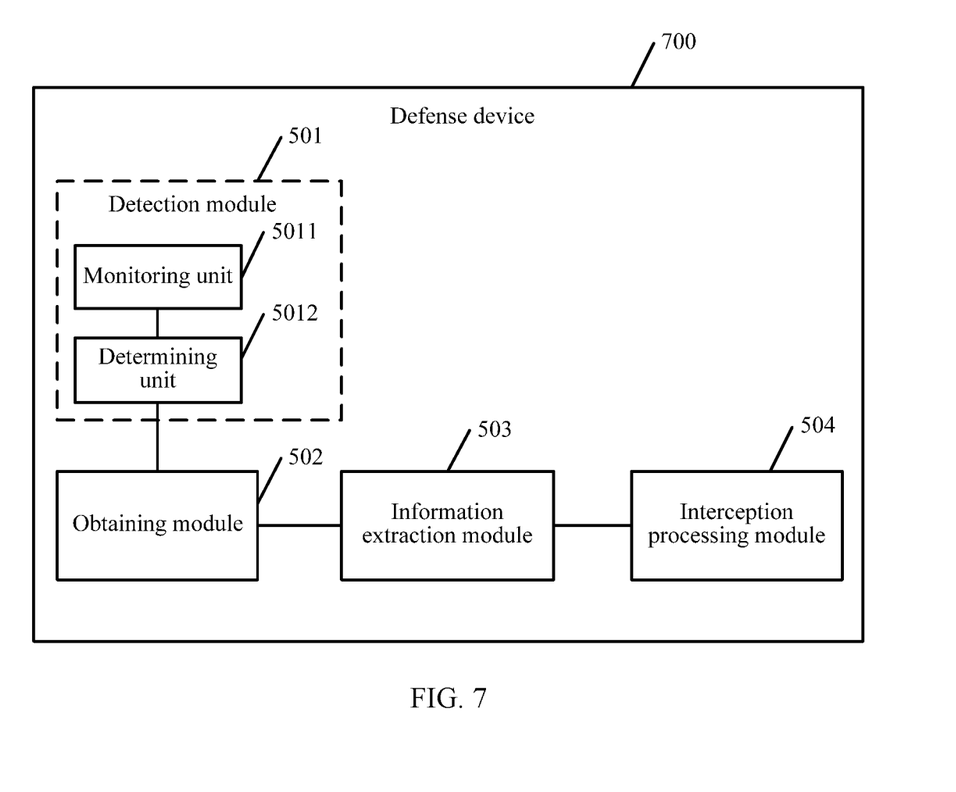
FIG. 7 is a schematic structural diagram of another embodiment of a defense device according to embodiments of the present disclosure.

Based on the embodiment corresponding to FIG. 5, referring to FIG. 7, the embodiments of the present disclosure further provide another embodiment of a defense device 700, including:

The detection module 501 further includes a monitoring unit 5011 and a determining unit 5012.

The monitoring unit 5011 is configured to monitor the number of UDP data packets received by the target host per unit time.

The determining unit 5012 is configured to determine that the target host is attacked by the UDP attack from the attack device, when the monitoring unit 5011 monitors that the number of UDP data packets is greater than a second threshold.

Further, the defense device in FIG. 5 to FIG. 7 is presented in the form of a functional module. The "module" may be an application-specific integrated circuit (ASIC), a circuit, a processor for executing one or more software or firmware programs and a memory, an integrated logical circuit, and/or another component that may provide the foregoing functions. In a simple embodiment, the defense device in FIG. 5 to FIG. 7 may use a form shown in FIG. 8.

Figure 8:
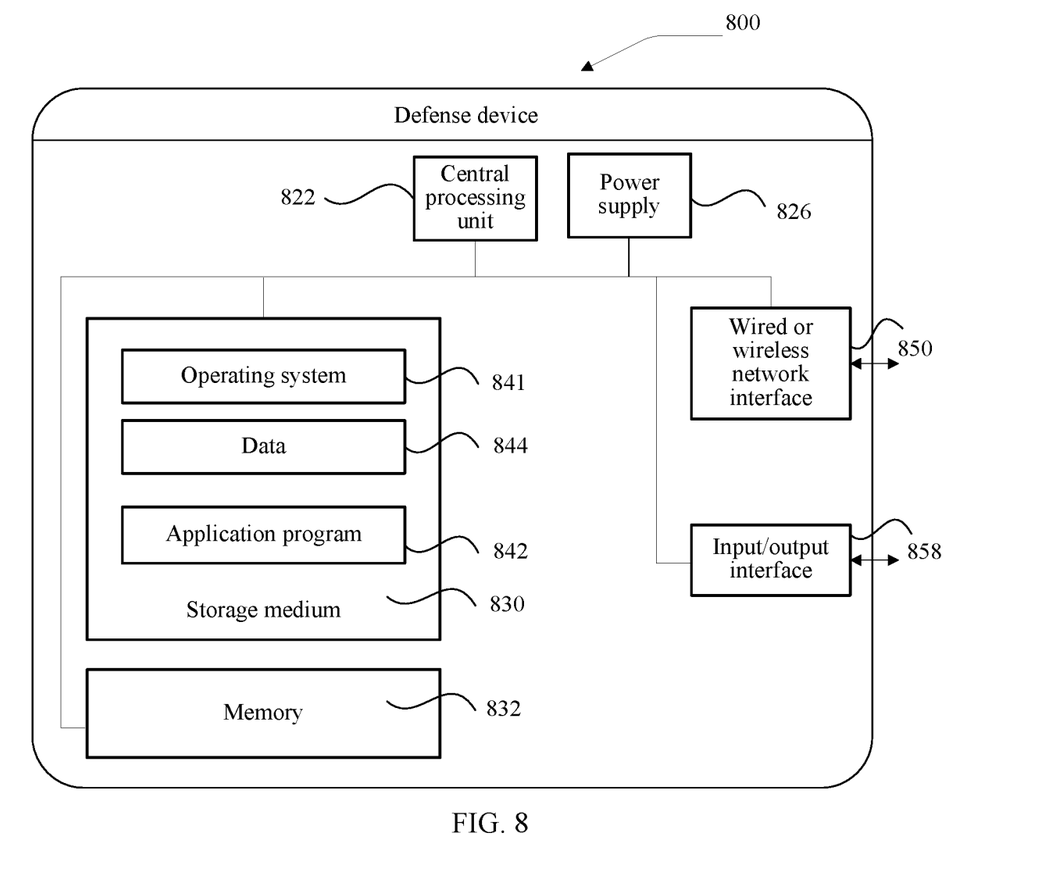
FIG. 8 is a schematic structural diagram of another embodiment of a defense device according to embodiments of the present disclosure.

FIG. 8 is a schematic structural diagram of a defense device according to an embodiment of the present disclosure. The defense device 800 may vary greatly due to different configurations or performance, and may include one or more central processing units (CPUs) 822 (for example, one or more processors), a memory 832, and one or more storage mediums 830 (for example, one or more mass storage devices) that store an application program 842 or data 844. The memory 832 and the storage medium 830 may be transient or persistent storages. The program stored in the storage medium 830 may include one or more modules (not shown), and each module may include a series of instruction operations for the defense device. Still further, the CPU 822 may be configured to communicate with the storage medium 830, and perform, on the defense device 800, the series of instruction operations in the storage medium 830.

The defense device 800 may further include one or more power supplies 826, one or more wired or wireless network interfaces 850, one or more input/output interfaces 858, and/or one or more operating systems 841, for example, Windows Server™, Mac OS X™, Unix™, Linux™, or FreeBSD™.

Steps performed by a defense device in the embodiments corresponding to FIG. 2 and FIG. 3 may be based on the structure of the defense device shown in FIG. 8.

The CPU 822 is configured to cause the defense device to perform the following steps: detecting whether a target host is attacked by a UDP attack from an attack device; obtaining an ICMP data packet sent back by the target host to the attack device, when the target host is attacked by the UDP attack from the attack device; extracting information about target ports in the ICMP data packet; and performing, according to the information about the target ports, interception processing on UDP data packets sent by the attack device to the target ports determined by the information extraction module.

In some embodiments, the CPU 822 is specifically configured to discard the UDP data packets sent by the attack device to the target ports.

In some embodiments, the CPU 822 is further configured to perform the following steps: determining distribution of the target ports according to the information about the target ports. The performing, according to the information about the target ports, interception processing on UDP data packets sent by the attack device to the target ports includes: performing, according to distribution of the target ports, interception processing on UDP data packets sent by the attack device to the target ports.

In some embodiments, the CPU 822 is specifically configured to perform the following steps: discarding the UDP data packets sent to the target ports, when the distribution of the target ports is the centralized distribution; or limiting, when the distribution of the target ports is the dispersed distribution, traffic of the UDP data packets sent to the target ports within a first threshold, or randomly discarding, by the defense device, at least one UDP data packet sent to the target ports.

In some embodiments, the CPU 822 is specifically configured to perform the following steps: monitoring, the number of UDP data packets received by the target host per unit time; and determining that the target host is attacked by the UDP attack from the attack device, if the number of UDP data packets is greater than a second threshold.

In the foregoing embodiment, a unit or a module may be all or partially implemented by using software, hardware, firmware or any combination thereof. When being implemented by software, the units or modules may be all or partially implemented in a form of computer program product.

The computer program product includes one or more computer instructions. When executed by one or more processors, the computer program instructions all or partially generate procedures or functions described according to the embodiments of the present disclosure. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, a computer, a server or a data center to another website, computer, server or data center in a wired (for example, a coaxial cable, an optical fiber, a digital subscriber line (DSL)) or wireless (for example, infrared, radio, or microwave) manner. The computer readable storage medium may be a data storage device such as a server or a data center integrated by any available medium or by one or more available mediums that may be stored in a computer. The available medium may be a magnetic medium (for example, a floppy disk, a hard disk, or a tape), an optical medium (for example, a digital versatile disc (DVD)), or a semi-conductive medium (for example, a solid state disk (SSD)).

A person skilled in the art may clearly learn that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, that is, may be located in one position, or may be distributed on a plurality of network unit. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or a compact disc.

In conclusion, the foregoing embodiments are merely intended to describe the technical solutions of the present disclosure, but not to limit the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for defending against a User Datagram Protocol (UDP) attack, the method being implemented by a defense device, the defense device comprising a memory, a processor, and a bus system, the memory being configured to store a computer program, the processor being configured to execute the computer program, the bus system being configured to connect the memory and the processor, to cause the memory to communicate with the processor, and the method comprising:
   detecting, by the defense device, whether a target host is attacked by a UDP attack from an attack device;
   obtaining, by the defense device, an Internet Control Message Protocol (ICMP) data packet sent back by the target host to the attack device, in response to detecting that the target host being attacked by the attack device;
   extracting, by the defense device, information about target ports in the ICMP data packet;
   determining, by the defense device, whether distribution of attacks on the target ports is a centralized distribution or a dispersed distribution according to a quantity of the target ports being attacked; and
   performing, by the defense device according to the information about the target ports, interception processing on UDP data packets sent by the attack device to the target ports, comprising:
      in response to determining that the distribution of the attacks on the target ports is the dispersed distribution: limiting, by the defense device, traffic of the UDP data packets allowed to pass through the target ports within a first threshold, or randomly discarding, by the defense device, at least one of the UDP data packets sent to the target ports; and
      in response to determining that the distribution of the attacks on the target ports is the centralized distribution, discarding, by the defense device, the UDP data packets sent to the target ports.

2. The method according to claim 1, wherein the detecting, by the defense device, whether a target host is attacked by a UDP attack from an attack device comprises:
   monitoring, by the defense device, the number of UDP data packets received by the target host per unit time; and
   determining, by the defense device, that the target host is attacked by the UDP attack from the attack device, if the number of UDP data packets is greater than a second threshold.

3. A defense device, comprising a memory and a processor;
   the memory being configured to store a computer program; and the processor being configured to execute the computer program in the memory, to specifically perform:
   detecting whether a target host is attacked by a User Datagram Protocol (UDP) attack from an attack device;
   obtaining an Internet Control Message Protocol (ICMP) data packet sent back by the target host to the attack device, when detecting that the target host is attacked by the UDP attack from the attack device;
   extracting information about target ports in the ICMP data packet;
   determining whether distribution of attacks on the target ports is a centralized distribution or a dispersed distribution according to a quantity of the target ports being attacked; and
   performing, according to the information about the target ports, interception processing on UDP data packets sent by the attack device to the target ports, comprising:
      in response to determining that the distribution of the attacks on the target ports is the dispersed distribution: limiting, by the defense device, traffic of the UDP data packets allowed to pass through the target ports within a first threshold, or randomly discarding, by the defense device, at least one of the UDP data packets sent to the target ports; and
      in response to determining that the distribution of the attacks on the target ports is the centralized distribution, discarding, by the defense device, the UDP data packets sent to the target ports.

4. The defense device according to claim 3, wherein the detecting whether a target host is attacked by a UDP attack from an attack device comprises:
   monitoring, by the defense device, the number of UDP data packets received by the target host per unit time; and
   determining, by the defense device, that the target host is attacked by the UDP attack from the attack device, if the number of UDP data packets is greater than a second threshold.

5. A non-transitory computer readable storage medium, storing a program instruction which, when being executed by a processor, causes the processor to perform:
- detecting whether a target host is attacked by a User Datagram Protocol (UDP) attack from an attack device;
- obtaining an Internet Control Message Protocol (ICMP) data packet sent back by the target host to the attack device, when detecting that the target host is attacked by the UDP attack from the attack device;
- extracting information about target ports in the ICMP data packet;
- determining whether distribution of attacks on the target ports is a centralized distribution or a dispersed distribution according to a quantity of the target ports being attacked; and
- performing, according to the information about the target ports, interception processing on UDP data packets sent by the attack device to the target ports, comprising:
  - in response to determining that the distribution of the attacks on the target ports is the dispersed distribution: limiting, by the defense device, traffic of the UDP data packets allowed to pass through the target ports within a first threshold, or randomly discarding, by the defense device, at least one of the UDP data packets sent to the target ports; and
  - in response to determining that the distribution of the attacks on the target ports is the centralized distribution, discarding, by the defense device, the UDP data packets sent to the target ports.

6. The storage medium according to claim 5, wherein the detecting whether a target host is attacked by a UDP attack from an attack device comprises:
- monitoring, by the defense device, the number of UDP data packets received by the target host per unit time; and
- determining, by the defense device, that the target host is attacked by the UDP attack from the attack device, if the number of UDP data packets is greater than a second threshold.

7. The method according to claim 1, wherein:
obtaining the ICMP data packet comprises: when a UDP port disabled by the target host receives a UDP data packet from the attack device, obtaining, by the ICMP data packet sent from the target host to the attack device, wherein the ICMP data packet carries information about the UDP data packet sent from the attack device,
extracting information about the target ports in the ICMP data packet comprises:
obtaining a destination port from the information about the UDP data packet carried in the ICMP data packet and determining the destination port as one of the target ports.

8. The method according to claim 1, wherein:
when the distribution of the attacks on the target ports is the dispersed distribution, one of the target ports is a service port enabled by the target host.

* * * * *